United States Patent [19]

Chow et al.

[11] Patent Number: 5,046,060
[45] Date of Patent: Sep. 3, 1991

[54] SERVO ERROR CONTROLS

[75] Inventors: William W. Chow; Alan A. Fennema, both of Tucson, Ariz.; Ronald J. Kadlec, Boca Raton, Fla.

[73] Assignee: International Business Machines Corporation, Armonk, N.Y.

[21] Appl. No.: 538,049

[22] Filed: Jun. 14, 1990

[51] Int. Cl.⁵ .............................................. G11B 17/22
[52] U.S. Cl. .................... 369/44.32; 369/32; 369/44.29; 369/44.28
[58] Field of Search ............... 369/44.26, 44.27, 44.28, 369/44.29, 44.31, 44.32, 32; 358/907

[56] References Cited

U.S. PATENT DOCUMENTS

| | | | |
|---|---|---|---|
| 4,553,181 | 11/1985 | Berti | 360/75 |
| 4,674,076 | 6/1987 | Hsieh et al. | 369/44.28 |
| 4,677,602 | 6/1987 | Okano et al. | 369/32 |
| 4,698,795 | 10/1987 | Yoshio | 369/44.28 |
| 4,719,610 | 1/1988 | Bates et al. | 369/32 |
| 4,740,939 | 4/1988 | Kimura et al. | 369/44.28 |
| 4,764,911 | 8/1988 | Morota et al. | 369/32 |
| 4,779,251 | 10/1988 | Burroughs | 369/44.28 |
| 4,931,889 | 6/1990 | Osafune | 369/32 |
| 4,932,013 | 6/1990 | Kojima et al. | 369/44.28 |
| 4,967,291 | 10/1990 | Touchton et al. | 369/32 |

*Primary Examiner*—Roy N. Envall, Jr.
*Assistant Examiner*—Hindi Nabil
*Attorney, Agent, or Firm*—H. F. Somermeyer

[57] ABSTRACT

In a disk recorder, unintended radial portions of a transducer or head, herein termed "skating", is rapidly controlled and stopped before the transducer or head can hit a crash stop. Even when a braking operation is effected in the wrong direction, the skating compensation reverses the braking operation for rapidly stopping the radial motion of a transducer. A pair of clamp circuits are electrically interposed between the servo actuator drive signal generation and a run-out compensation circuit such that the clamping operation does not alter the run-out compensation. The sequences of machine states for effecting the state accommodation are described.

9 Claims, 3 Drawing Sheets

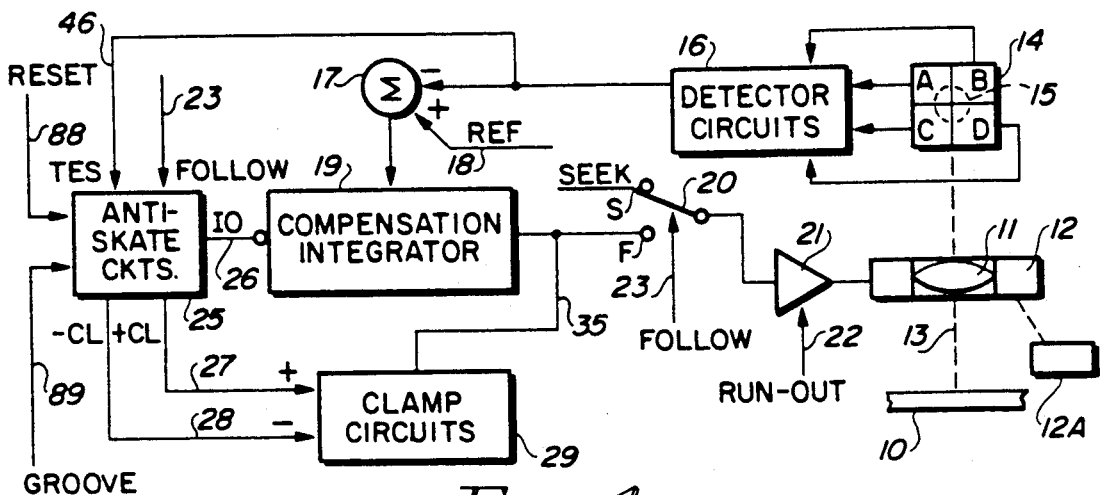
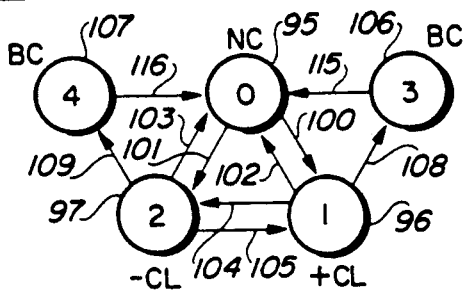
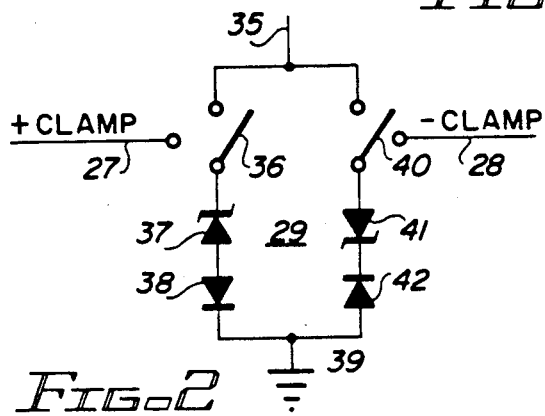
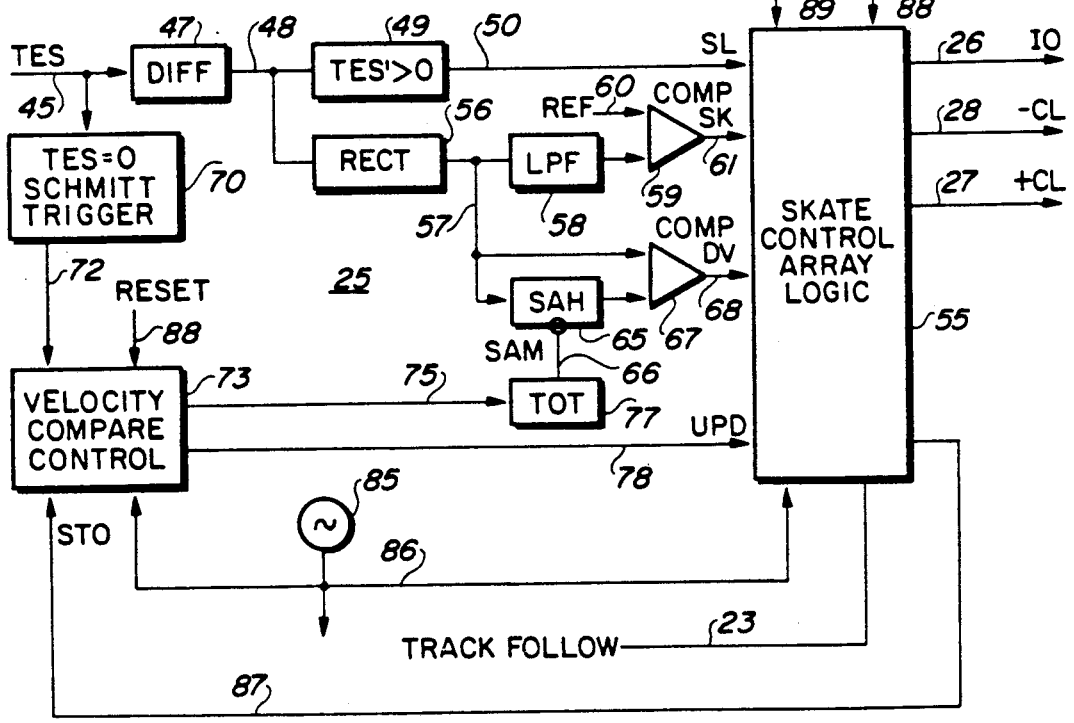

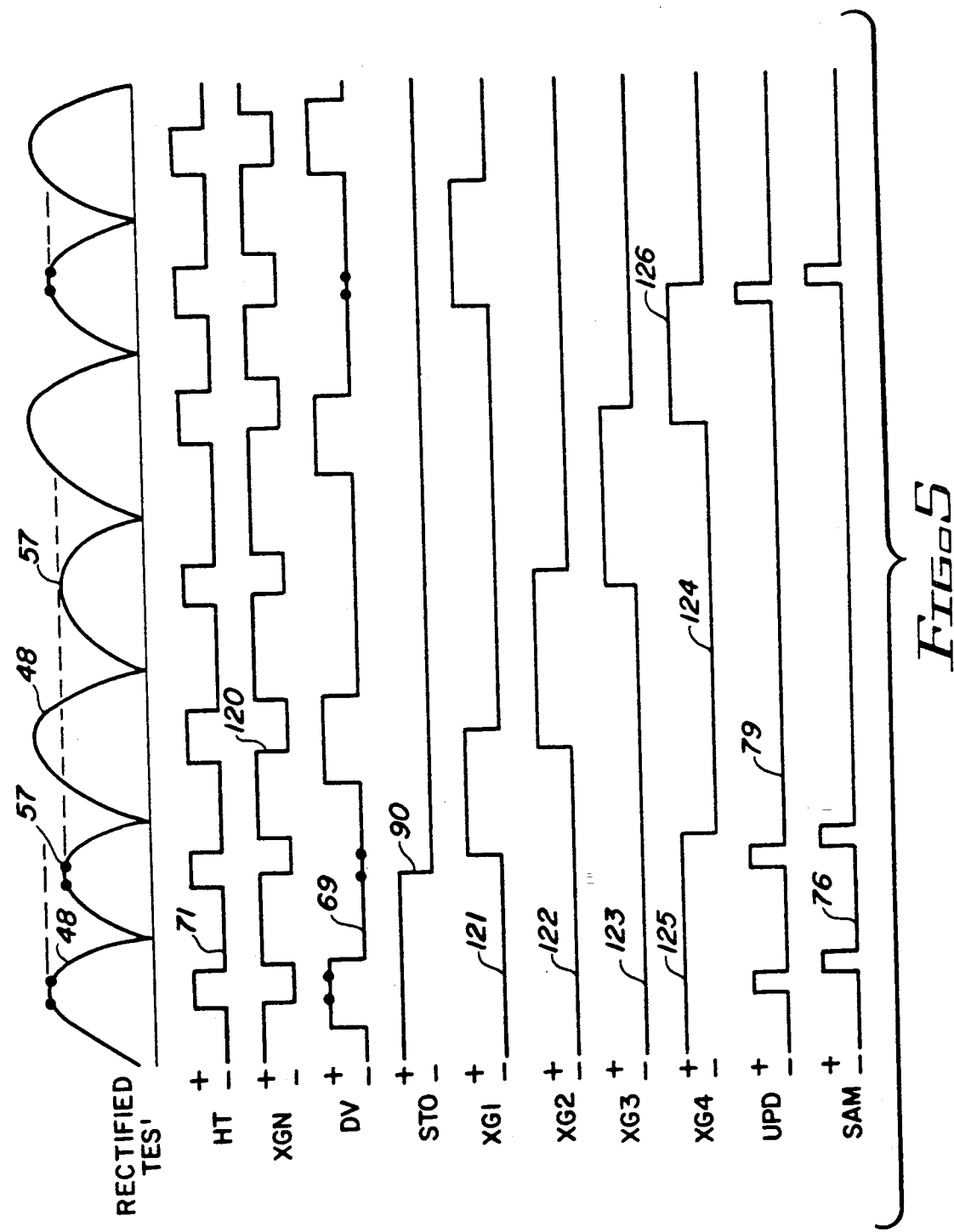

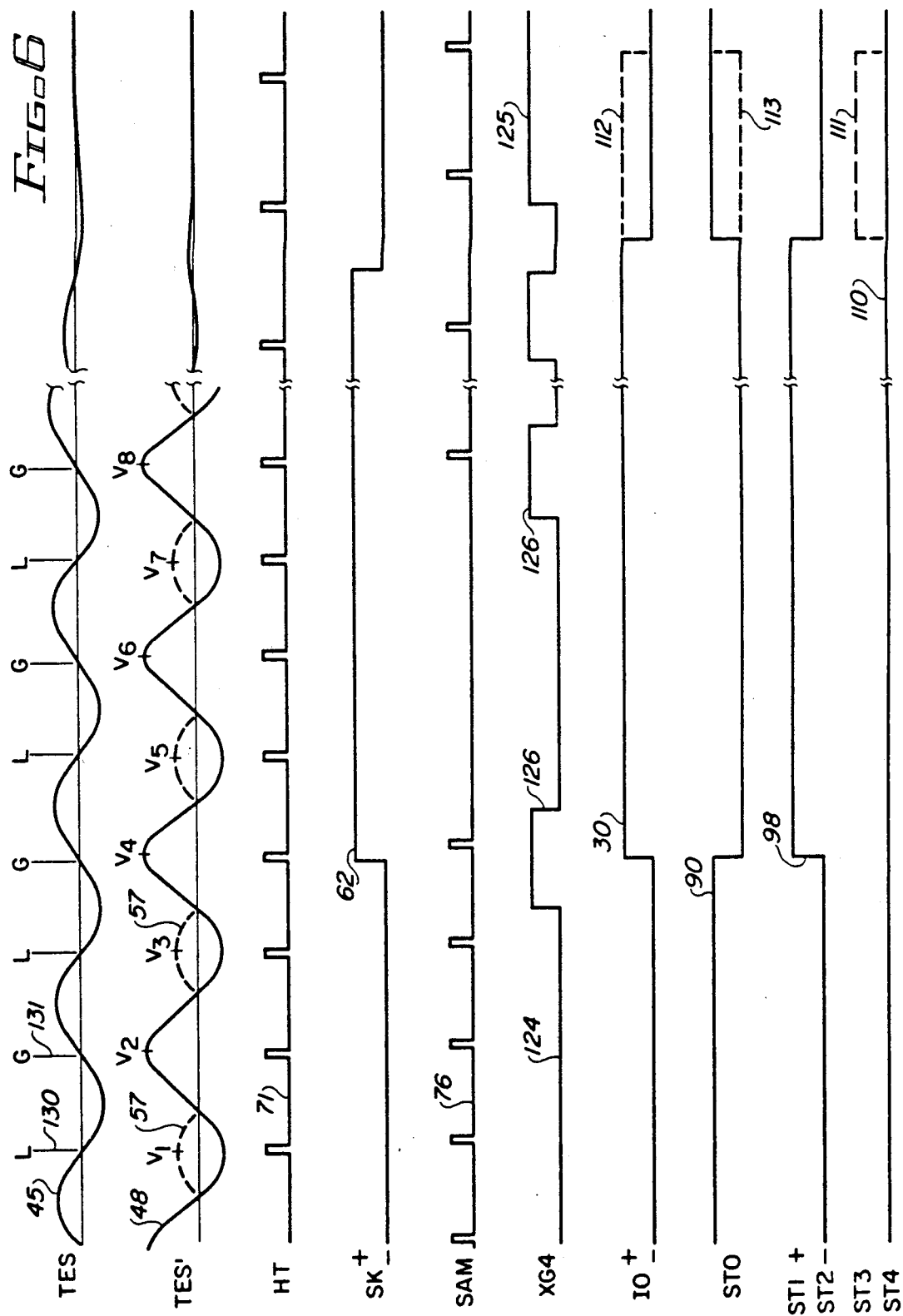

SERVO ERROR CONTROLS

Field of the Invention

The present invention relates to servo positioning controls, particularly those controls usable with optical disk recorders and players.

BACKGROUND OF THE INVENTION

Disk recorders of all types, magnetic or optical, and so forth have used headcrash stops at the inner and outer peripheries of the recording areas for preventing the headarm from moving too far away from the recording area for preventing damage to the head and record member. Other schemes include providing sensors for sensing the extremities of permitted head movement on the disk and then braking the servo when the head position outside the permitted area is detected. An example of a headcrash control is shown by Berti in U.S. Pat. No. 4,553,181. Berti inserts a resistance-capacitive circuit between the servo control circuits and the head actuator so that without detracting from head access time, the maximum head velocity will be limited to a value which prevents damaging headcrashes even when a fault occurs in the servo system. It is desired to provide a more positive control of the head when a head is moving uncontrollably "skating" radially of the disk, either radially inwardly or outwardly. It is also desired to provide for a recovery from an error condition rapidly and positively without special sensors, i.e., electronic circuits will be used to detect and correct so-called headskating. Such headskating can be caused by an impact on the record player, for example.

SUMMARY OF THE INVENTION

It is an object of the invention to provide enhanced control of a transducer or head in a disk player for positively and quickly limiting uncontrolled excursions of the head. In accordance with the present invention, the disk player which has servo control circuits for radially positioning a transducer or head including a track following servo connected to the head for receiving a tracking error signal from the head and supplying a track following signal to an actuator that moves the head which includes skate detection means connected to the tracking means for receiving the TES (tracking error signal) and being responsive to the received TES indicated on unexpected head velocity and generating a skate flag signal for indicating the unexpected head velocity. Velocity means are connected to the tracking means also receiving the TES and for responding to such received TES for generating a velocity change (increase-/decrease) signal. Also included is a skate control means connected to the velocity means and to the skate detection means for combining the change signal and the flag signal to generate a head slowdown signal having a first polarity for reducing velocity in the first radial direction and a second polarity for reducing velocity in the second radial direction which is opposite to the first radial direction. Finally, asymmetric current limiting means is electrically interposed between the tracking means and the actuator and is connected to the skate control means for receiving the slowdown signal and for responding to the slowdown signal to clamp operation of the servo control signal to slow the head down in the direction indicated by the slowdown signal and skate detection means is further operative to indicate a reduction in head velocity to a predetermined value and being operatively connected to the skate control means for actuating it to terminate the asymmetric current limiting operation. Asymmetric current limiting clamps the servo control signal, i.e., the actuator signal for braking same to a stop condition.

The foregoing and other objects, features, and advantages of the invention will be apparent from the following more particular description of preferred embodiments of the invention, as illustrated in the accompanying drawings.

DESCRIPTION OF THE DRAWINGS

FIG. 1 is a simplified diagrammatic showing of an optical player incorporating the teaching of the present invention.

FIG. 2 is a schematic diagram showing clamp circuits for effecting asymmetric current limiting in the FIG. 1 illustrated apparatus.

FIG. 3 is a detailed logic diagram showing of the antiskate circuits of FIG. 1.

FIG. 4 is a machine-state diagram which describes the operation of the antiskate circuits of FIG. 1.

FIG. 5 is a set of idealized waveforms illustrating the operation of the velocity compare control of the FIG. 3-illustrated antiskate circuits.

FIG. 6 is a set of idealized signal waveforms used to describe the operation of the skate control array logic of FIG. 3.

DETAILED DESCRIPTION

Referring now more particularly to the appended drawings, like numerals indicate like parts and structural features in the various features. Referring firstly to FIG. 1, an optical disk 10 having concentric circular grooves with intervening lands contains record tracks in either the grooves or the lands. Signals are recorded onto the record tracks (which can be either in a land or groove, as is known) and sent from the record tracks using known techniques via an objective or focusing lens 11. Lens 11 is mounted for radial and axial motion in actuator 12. Actuator 12, insofar as the present description is concerned, will be referred to as only having radial motions, i.e., for track following and for short radial moves. A second carriage (12A) carries the fine actuator 12 for long radial seeks or motions. In a preferred form, carriage 12A is actuated to follow the radial motions of actuator 12. The laser light (laser not shown but constructed in the usual manner) 13 impinges upon disk 10 and is reflected through lens 11 to the detector element 14. Detector element 14 consists of four rectangularly-arrayed photoelements A, B, C, and D. Numeral 15 identifies the crossectional circular shape of the reflected beam 13 on the detector element 14 when the beam 13 is following a track on disk 10. Detector circuits 16 receive the individual signals from elements A, B, C, and D for detecting, the faithfulness of the track following and for indicating radial motion of the beam 13 with respect to disk 10 by generating a tracking error signal TES as is known in the art. It should be understood that not shown in FIG. 1 but included in the practical embodiment is the laser source, a beamsplitter optically interposed between the objective lens 11 and detector element 14, all is well known in the art. Data detection circuits also would be included in a practical optical disk player. Such circuits are not shown for purposes of brevity.

FIG. 1 shows the track following loop found in the optical disk recorder. The tracking error signal from detector circuit 16 is applied to track following summation circuit 17 wherein the tracking error signal amplitude is compared with the reference supplied over line 18. Such reference is usually logically ground reference potential. The difference between the reference signal and TES is a control signal required to bring the lens 11 back to where the beam 13 is again track centered on disk 10. To this end, compensation and integrator 19 receives the summation circuit 17 signal. Element 19 may be constructed by Fennema et al. in U.S. Pat. No. 4,839,876. Compensation-integrator 19 supplies a servo correction signal through mode switch 20, thence power amplifier 21 to actuator 12. Mode switch 20 is electronically controlled by the follow signal on line 23 to connect the F or follow terminal to power amplifier 21 in the track following mode and a radial motion called a seek is desired then the electronic switch 20 switches to the seek terminal S which is connected to seek circuits (not shown) which effect such a long radial movement. Elliptic or a run-out control signal is supplied over line 22 from a usual source (not shown) to alter the actuation signal from power amplifier 21 such that the signal to actuator 12 follows the eccentricity or runout of disk 10.

In accordance with the present invention, antiskate circuits 25 are added to the track following loop. The TES is supplied to antiskate circuits 25 over line 45. The follow mode is indicated by the signal on line 23 (line 23 is broken in two parts for signifying FIG. 1). Antiskate circuits 25 detect an unintended radial motion of the head 11,12 and then takes action to brake the head to a stop condition whereupon track following re-ensues. Then the machine must seek back to the original track for continuing the data processing operation. Such seeking and operation is not necessary to an understanding of the present invention. During a so-called skate condition, i.e., the unintended radial motion of the head 11, 12, the integrator portion of circuits 19 are turned off by the IO (integrator off) signal supplied over line 26. This action prevents the TES as compared in summation circuit 17 from altering the operation of the track following loop during the skate condition. This action facilitates the braking operation. Antiskate circuits 25 during the skate condition, generate one or both of clamp effecting signals supplied respectively over lines 27 and 28. The +CL supplied when the skating is radially outward while the −CL signal over line 28 is supplied on radially inward skating. Clamp circuits 29 respond to either or both of the lines 27, 28 signals as will be described for effecting a braking operation and a possible coasting operation for terminating the undesired skate condition. Provisions are made for reversing the direction of braking in the event the initial determination of skate direction is erroneous.

The IO signal 26 is best seen in FIG. 6.

Clamp circuits 29 are best seen in FIG. 2. Line 35 connects clamp circuits 29 to the F terminal of mode switch 20 for clamping the output of compensation and integrator 19 to near ground reference potential respectively as will be described. The radial outward clamping as actuated by a +CL signal on line 27 closes normally open electronic switch 36 to connect line 35 to ground reference potential at numeral 39. Zener diode 37 provides a clamping threshold while diode 38 provides the clamping polarity. Only negative signal excursions are permitted, i.e., ones that tend to brake the skating head motion. In a similar manner, the −CL signal on line 28 closes normally open electronic switch 40 for connecting line 35 to ground reference potential at number 39 via Zener diode 41 and clamp polarity control diode 42. Zener diode 41 provides a clamp threshold while diode 42 does the polarity selection. In this situation, only positive tracking control signal excursions are permitted at the F terminal of mode switch 20, which effects a braking action.

Referring next to FIG. 3, antiskate circuits 25 are described in broad terms. Antiskate circuits 25 include both analog and digital circuits. The analog circuits supply three inputs into the digital circuits or logic: slope of TES, skate detection or termination and a velocity change signal (increasing or decreasing). These signals occur based upon the relationship of the head 11, 12 with respect to optical disk 10 and therefore are asynchronous with respect to operations of the digital portion of antiskate circuits 25. The slope signal SL is obtained comparing TES' to zero at its peak amplitude. Skate detection is obtained by examining the amplitude and frequency of TES', both of these parameters indicate relative radial velocity of head 11, 12 with respect to the surface of disk 10. A threshold is provided, such threshold having a setting based upon the performance parameters of the optical disk player in which the invention is being incorporated. If the thresholds are exceeded for the duration of more than one millisecond, then a skate flag SK is set up indicating a skate condition. The minimum values of amplitude and frequency which can activate a skate flag SK is a predetermined percentage of the TES normal amplitude, i.e., design point and a track crossing frequency of a predetermined rate which, of course, indicates radial velocity of the head with respect to the surface of disk 10. The arrangement is such that if the frequency is higher, i.e., a greater radial velocity, then the skate flag SK will be set quicker; on the other hand, if the amplitude of the TES is higher, then setting the SK flag will also occur faster. This means that the frequency and amplitude parameters used to set up the threshold for skate protection are interactive. When the TES amplitude drops below, for example 50% of the nominal amplitude or the frequency goes under the radial velocity threshold, then the skate flag is turned off. In the velocity change function, when the velocity compare function detects an acceleration, then the direction of velocity change signal DV is equal to one while a decrease or no change in head velocity makes DV equal to zero. During the track following mode, the velocity compare is made at every half track, i.e., every zero crossing of TES signal 45 (FIG. 6). While during the skate condition, every velocity is measured every four half tracks or two full tracks. Direction control for braking is also provided as also will become apparent.

Signal TES 45 (FIG. 6) is received from detector circuit 16 over line 46. Next, the comparison circuits are described. Differentiator DIFF 47 differentiates TES 45 to create TES' 48 (FIG. 6) circuit TES'>0 49 receives TES' from Differentiator 47. Whenever the amplitude of TES' are greater than zero, then the slope signal SL on line 50 is set to unity. Whenever the amplitude of TES' is less than zero, then SL is set to zero.

A skate flag is detected by the skate generating circuits as next described. Rectifier RECT 56 receives TES' signal 48 from Differentiator 47 and rectifies the negative half cycles to positive half cycles 57 as best seen in FIG. 5. Low-pass filter LPF 58 delays the rectified signal and then combines the amplitude and frequency parameters above described in a known manner. LPF 58 supplies its output signal to switching comparator 59 which receives a reference signal over line 60. When the threshold 60 is exceeded by the LPF 58 signal, then the skate flag SK 62 is set to unity and supplied over line 61 to skate control array logic 55. Unity is represented in FIG. 6 by the positive excursion of SK 62.

The change in radial velocity of the head is generated by comparing the measured velocity of a first time sample period with the measured velocity in the next ensuing sample period. Sample and hold circuit SAH 65 is activated by a signal on line 66, as later described, to receive the rectified signal 57 at its peak amplitude, i.e., the peaks of signal 48. This signal is retained in SAH 65 for comparison with the next ensuing rectifier 56 supplied signal by switching comparator 67. When comparator 67 detects that the current measured velocity received from rectifier 56 is greater than the measured velocity stored in SAH 65, radial velocity is increasing. In this situation, the DV signal 69 (FIG. 5) is set to unity and is supplied over line 68 to skate control array logic 55. On the other hand, if the current measured velocity signal as received from rectifier 56 is less than the value stored in SAH 65, then DV is equal to zero indicating a deceleration or constant velocity of the head 11, 12 with respect to disk 10.

The timing of operations including sampling and evaluation of the above-described signals is timed to the zero axis crossing HT of TES 45. The circuits do not sense the instantaneous head position, whether the head over a land or groove. To this end, the Schmidt trigger 70 acts as a pulse shaper and is activated to generate a pulse whenever TES value is at a zero axis crossing, i.e., in the middle of the groove or in the middle of a land as is known. The pulses are called half-track HT pulses 71 (FIGS. 5–6). HT pulses 71 travel over line 72 to velocity compare control 73 which time enables the updating of the machine state as later described of antiskate circuits 25.

Velocity compare control 73 supplies a sample signal SAM 76 over line 75 to activate timeout timer TOT 77. TOT 77 supplies the enabled sample SAM 76 over line 66 to activate SAH 65 to receive and store the indicated velocity signal. Velocity compare control 73 also determines when updating should occur by skate control array logic 55. To this end, an update UPD signal 79 travels over line 78 from velocity compare control 73 to skate control array logic 55. UPD 79 times the skate control array logic to change states for controlling the skate error condition. The high frequency clock or oscillator 85 supplies timing pulses over line 86 to all circuits including skate control array logic 55 and velocity compare control 73 for synchronizing the digital operations thereof in a known manner. Skate control array logic 55 supplies a state ST0 signal 90 over line 87 to velocity compare control 73. ST0 (positive) indicates to velocity compare control 73 that skate control array logic 55 is indicating successful track following, i.e., a non-skate condition. A pair of reset lines 88 respectively connected to skate control array logic 55 and velocity compare control 73 reset the state of both the logic circuits to ST0, i.e., a non-skate condition. Further, a GRV signal starts over line 89 to skate control array logic 55 indicates whether the recording area is in a groove or a land. When GRV=1, the system track follows a groove for recording and readback; when GRV=0, a land contains the data so that the system track follows a land.

FIG. 4 shows the five logical or machine states of state control array logic. State 0, indicated by numeral 95, means no clamping action. Machine states ST1 and ST2 respectively are indicated by circles 96 and 97 and occur respectively when a skating condition is detecting in a radially-outward or in a radially-inward direction. ST1 occurs in a skating selection function in the same time that ST2 occurs. Accordingly, numeral 98 of FIG. 6 presents the timing of either ST1 or ST2. During the state accommodation and recovery procedures skating conditions may be rectified before the beam 13 is to settle on a record track of disk 10 to be followed upon a completion of the braking action. To this end, states ST3 and ST4 respectively denominated by numerals 106, 107 cause both of the clamp circuits to be activated by closing both switches 36 and 40 as indicated in FIG. 4 by the abbreviation BC. Upon completion of the coasting, ST0 state is again entered as indicated at 95.

The sequence of the state operations include indications by arrows 100 and 101 from ST0 to either state ST1 or ST2 respectively for detection of a state in a radially-outward direction or a radially-inward direction. Whenever the skating condition is rectified from either ST1 or ST2, state ST0 at 95 is re-entered as indicated by arrows 102, 103. In this situation, the head 11, 12 has been stopped and is ready to track follow on a record track of disk 10. Once the head is on the record track of disk 10, it can be moved through a seek operation to a track from which the skating condition arose. In the event that in either state ST1 or ST2 (96, 97) the head is accelerating as indicated by DV signal 69 (FIG. 5), then the initial presumed direction of skating is erroneous. In the skating condition being made worse rather than by being solved. This time, the opposite direction of braking must be applied, i.e., the clamp circuit 29 operation must be reversed. Accordingly, the state condition of array logic 55 is reversed as indicated by arrows 104 and 105 for effecting a reverse braking direction. If the head slows down to the wrong disk feature, groove or land, head 11, 12 is allowed to coast radially to a track which can be followed. This condition is respectively found in states ST3 106 and ST4 107 respectively for coasting radially out or radially in. The coasting is affected by making both clamps positive and negative active such that no signal goes through power amplifier 21 to actuator 12. Going from a braking situation in ST1 or ST2 to a coasting situation in ST3 or ST4 is respectively indicated by arrows 108 and 109. Respectively for coasting radially outward and radially inward on the end of the coast, ST0 95 is entered as indicated by arrows 115 and 116 respectively from states ST3 106 and ST4 107. This state change action is shown in FIG. 6 by signal 110 which represents either state ST3 or ST4. Without coasting, there is no entrance of ST3 or ST4, however, when coasting occurs, as indicated by numeral 111, then the states are on for a short period of time. Correspondingly, ST0 95 is switched off as indicated by numeral 113 and signal 90 while the integrator off signal IO 30 remains on longer as indicated by numeral 112.

The operation of velocity compare 73 is such that it samples and holds the previous velocity every half track (HT) when the system is in ST0=1, i.e., track following and not skating. When the servo system is skating (ST0=0), the velocity sampling rate is reduced from every half track to every two tracks (four half-track crossings). The changeover from ST0=1 to ST0=0 occurs only when the skate flag SK is active and DV is zero. Skate control array logic 55 acknowledges flag SK and controls the skate while DV=0, i.e., the braking operation of clamp circuit 29 is slowing 25 the radial velocity of the head. However, if DV=1, the head is accelerating then there is an initial waiting for one-half a track pitch until head 11, 12 pores over the data recording feature, groove or land. At the end of each sample period, the UPD pulse on line 78 is issued for updating the velocity indication and detecting the skating flag and the slope signal.

FIG. 5 shows the detail internal timing of velocity compare control 73. The signal XGN means no zero crossing when it is positive. XGN is derived from HT 71 by synchronizing with clock 85 and is used in the logic of velocity compare control 73 to prevent double counting. Signals XG1-XG4 121-124 respectively indicate 1, 2, 3 and 4 zero crossings occurring during a sample period during skate correction. Traditionally, XG4 portion 125 is active during state ST0 as indicated by signal 90. XG4 therefore provides for two functions enabling the velocity sampling during a non-skate condition (ST0=1) and for enabling the velocity and updating function as indicated by portion 126 during a skate condition, i.e., average two tracks. UPD signals 79 are enabled only when XG4 is positive as indicated by numerals 125 or 126. SAM 76 is also issued after UPD 79 by a velocity compare control for sampling the measured velocity as above described. The logic of operation or velocity compare control 73 is shown in the equations below. Firstly, the legend showing the equation terms and functions is first given:

LEGEND

+CL = positive clamp being applied
−CL = negative clamp being applied
DV+ = head velocity is increasing
DV− = head velocity is reducing
GRV = groove tracking; land tracking
HT = zero axis crossings of TES
IO = turn off track following integrator
RN = reset input is not active
SAM = sample command
SK = skate flag
SL+ = TES has a positive slope
SL− = TES has a negative slope
ST0 = state 0 of logic array
ST1 = state 1 of logic array
ST2 = state 2 of logic array
ST3 = state 3 of logic array
ST4 = state 4 of logic array
UPD = update command
XG1 = one half-track crossing
XG2 = two half-track crossings
XG3 = three half-track crossings
XG4 = four half-track crossings or not skating
XGN = not at a track crossing
XGZ = HT followed by XGN
{ } = logical AND function
' = logical NOT; without ', function is TRUE
( ) = logical AND function
* = logical AND function
+ = logical OR function

EQUATIONS SHOWING THE LOGIC OF VELOCITY COMPARE CONTROL 73 (FIG. 5)

XG1 = RN * {ST0' * XG4 (XGZ − (HT * UPD)) − (XG1 * XG2')}   (1)
XG2 = RN * {(ST0' * XG1 * XGZ) − (XG2 * XG3')}   (2)
XG3 = RN * {(ST0' * XG2 * XGZ) − (XG3 * XG4')}   (3)
XG4 = RN' − (ST0' * XG3 * XGZ) − (XG4 * XG1')}   (4)
UPD = (ST0 * XGZ) − (ST0' * XG4 * XGZ)   (5)
SAM = UPD (XG1 − XG4)   (6)

The logic of skate control array logic 55 is best understood by examining FIG. 6 and the equations set forth on the following page. In FIG. 6, 132 indicates the timing for detection window responding to the zero axis crossing of TES'. The FIG. 6 showing along with the equations on the following page show the detailed operation of array logic 55:

EQUATIONS SHOWING THE LOGIC OF THE SKATE CONTROL ARRAY LOGIC 55

ST0 = RN − (ST1 * SK * GRV' * SL−)   (7)
  − (ST1 * SK' * GRV * SL−)
  − (ST2 * SK' * GRV' * SL−)
  − (ST2 * SK' * GRV * SL−)
  − (ST0 * ST1')
  − (ST0 * ST2')
ST1 = RN * {(ST0 * SK * DV− * GRV' * SL−)   (8)
  − (ST0 * SK * DV' * GRV * SL−)
  − (ST2 * SK * DV− *)
  − (ST1 * ST0')
  − (ST1 * ST2')
  − (ST1 * ST3')}
ST2 = RN * {(ST0 * SK * DV− * GRV' * SL−)   (9)
  − (ST0 * SK * DV− * GRV * SL−)
  − (ST1 * SK * DV−)
  − (ST2 * ST0')
  − (ST2 * ST1')
  − (ST2 * ST4')}
ST3 = RN * {(ST1 * SK' * GRV' * SL−)   (10)
  − (ST1 * SK' * GRV * SL−)
  − (ST3 * ST0')}
ST4 = RN * {(ST2 * SK' * GRV' * SL−)   (11)
  − (ST2 * SK' GRV * SL−)
  − (ST4 * ST0')}
IO = ST1 − ST2 − ST3 − ST4   (12)
−CL = ST1 − ST3 − ST4   (13)
−CL = ST2 − ST3 − ST4   (14)

From all of the above it can be seen that irrespective of direction of the initial skate compensation that the undesired or unattended radial movement of the head 11, 12 can be compensated for and brake rapidly. Upon completion of the skate compensation wherein the head 11, 12 is stabilized over a record track of disk 10, the portion 125 of XG4 resumes in the non-skate condition. Also note that the clamping action occurs between power amplifier 21 and compensation 19 such that the run-out compensation continues even during the clamping operations. During clamping actuator 12, rather than continue actuating carriage 12A to follow actuator 12 motions, it is desirable to dynamically brake carriage 12A. Such dynamic braking is easily achieved by shorting the carriage 12A actuating coil(s) by an electronic switch (not shown).

While the invention has been particularly shown and described with reference to preferred embodiments thereof, it will be understood by those skill in the art that various changes in form and details may be made therein without departing from the spirit and scope of the invention.

What is claimed is:

1. In an optical disk player, servo control circuits including tracking means for sensing spatial relationships of a head to a record member having grooves and lands respectively physically identifying record tracks and inter-track areas and a track following servo connected to the head for receiving a tracking error signal TES and supplying a track following signal to an actuator that moves the head;

the improvement including, in combination:

skate detection means connected to said tracking means for receiving said TES and being responsive to the received TES to indicate the actual radial velocity value of the head, threshold means in the skate detection means indicating an unexpected head velocity value; a comparator means in the skate detection means for comparing the actual radial velocity value with said indicated unexpected head velocity value to indicate an unexpected actual head velocity as the actual radial velocity is not less than said indicated unexpected head velocity for generating a skate flag signal for indicating the actual head velocity value exceeds the indicated unexpected head velocity value;

velocity means connected to the tracking means for receiving the TES and responding to such received TES for generating a direction of velocity change signal;

skate control means connected to said velocity means and said skate detection means for combining the direction of velocity change signal and said flag signal to generate a slow-down signal having a first polarity for reducing velocity in a first radial direction and a second polarity for reducing velocity in a second radial direction which is opposite to the first radial direction;

asymmetric current limiting means electrically interposed between said tracking means and said actuator, said asymmetric current limiting means being connected to said skate control means for receiving said slow-down signal and said asymmetric current limiting means being responsive to said slow-down signal to clamp operation of the servo control signals to slow the head down in the direction indicated by the slow-down signal; and said skate detection mans having means indicating a predetermined value of head velocity, said skate detection means having compare means for comparing the indicated value of head velocity with the actual value of head velocity for for indicting a reduction of the head velocity to a predetermined value and said skate detection means being operatively connected to said skate control means for actuating said skate control means to terminate said asymmetric current limiting means operation.

2. In the player set forth in claim 1, further including, in combination:

said servo circuits having an integrator circuit for generating a track following control signal; and said skate control means being connected to the integrator circuit for turning it off when said slow-down signal is being supplied to the current limiting means.

3. In the player set forth in claim 2, further including, in combination:

said skate detection means including means for detecting the frequency and amplitude of TES and generating said skate flag signal when the TES exceeds a predetermined threshold of said frequency and amplitude, wherein said predetermined threshold is an indication of the indicated unexpected head velocity value and said frequency and amplitude of the TES indicating the actual velocity value.

4. In the player set forth in claim 3, further including, in combination:

means in the skate control means for causing the head to coast and operative to actuate the skate control means to supply two slow-down signals for removing any servo control from the head.

5. In the player set forth in claim 4, further including, in combination:

said skate detection means indicating that said TES signal amplitude is near zero and said skate control means being responsive to said indication to turn the integrator on for resuming track following.

6. In the player set forth in claim 5, further including, in combination:

a power amplifier effectively electrically interposed between the actuator and the asymmetric current limiting means; and a radial run-out compensator electrically interposed between said asymmetric current limiting means, said power amplifier and the actuator.

7. In an optical disk player, servo control circuits including tracking means for sensing spatial relationships of a head to a record member having grooves and lands respectively physically identifying record tracks and inter-track areas and a track following servo connected to the head for receiving a tracking error signal TES and supplying a track following signal to an actuator that supports the head for movements across the grooves and lands;

skate detection means connected to said track following servo for receiving TES and for analyzing same to detect radial head skating and for supplying a skate signal indicating head skating is occurring;

clamp means connected to the track following servo and to the skate detection means for responding to the skate signal to limit the operation of the track following servo to slow down the radial velocity of the head; and said skate detection means being operative for detecting that the head is not radially skating and then removing the skate signal such that the clamp means in the absence of a skate signal releases the limiting control on the track following servo.

8. In a method of operating an optical disk player which includes causing a transducing head to follow or scan a record track of an optical medium, including the steps of:

during a track following operation wherein the head is scanning a record track with supposedly zero cross-track velocity, sensing and indicating a predetermined radial velocity of the head which corresponds to the head moving cross-track of the medium;

in response to the indication, clamping operation of a servo seeking circuit of the optical disk player for reducing the cross-track velocity of the head in said current cross-track direction; and detecting that the head has zero cross-track velocity, then resuming said track following operation.

9. In the method set forth in claim 8, wherein a coarse carriage relatively movably carries a fine actuator which supports the head the steps of, during said clamping action on the fine actuator dynamically braking the coarse carriage.

* * * * *